Dec. 4, 1923.    1,475,939
J. DITSON
APPARATUS FOR FORGING FIVE-POINT ROCK DRILL BITS
Filed June 30, 1922    2 Sheets-Sheet 1

INVENTOR
Jesse Ditson.
BY
Herbert G. Ogden
HIS ATTORNEY

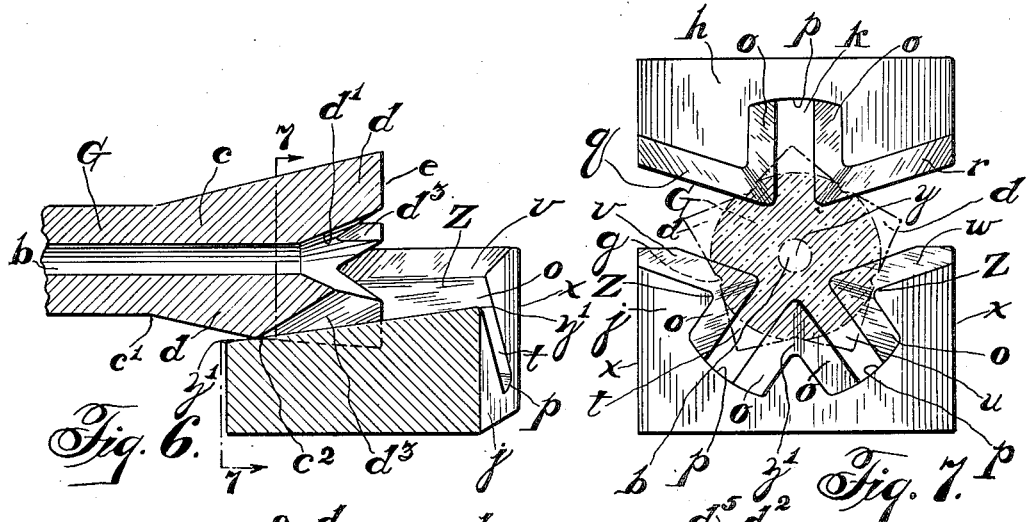
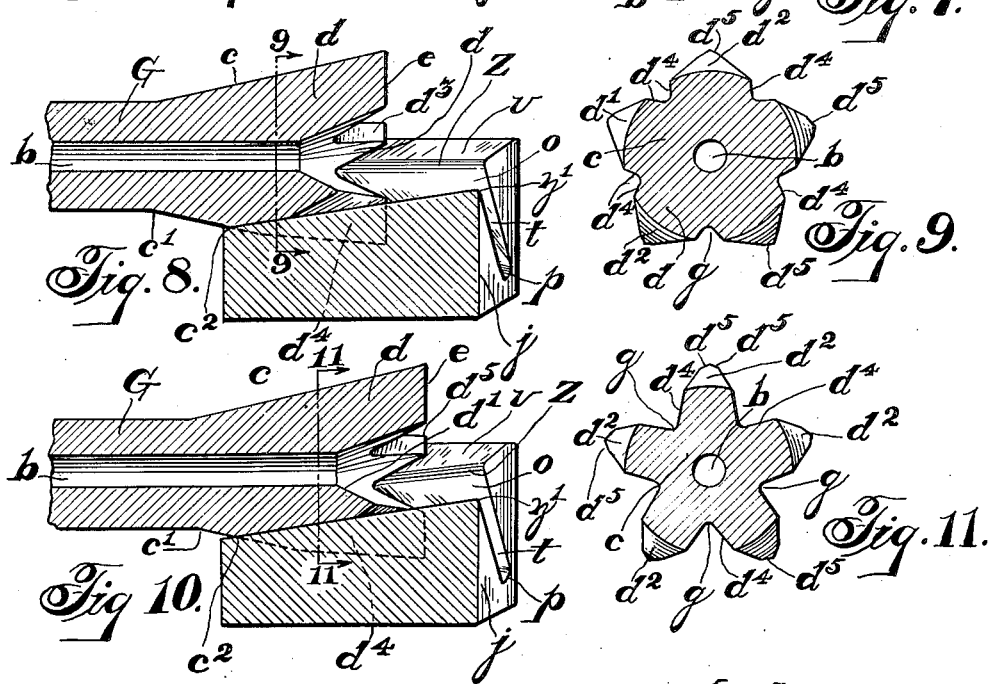
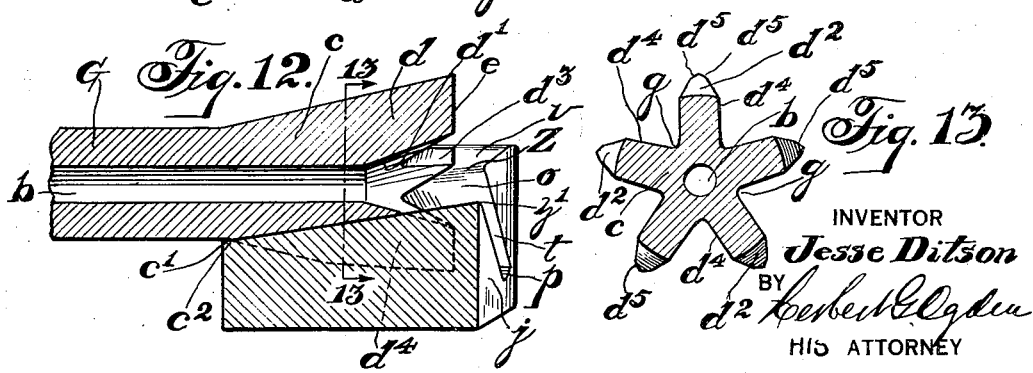

Patented Dec. 4, 1923.

1,475,939

UNITED STATES PATENT OFFICE.

JESSE DITSON, OF LITTLETON, COLORADO, ASSIGNOR TO INGERSOLL-RAND COMPANY, OF JERSEY CITY, NEW JERSEY, A CORPORATION OF NEW JERSEY.

APPARATUS FOR FORGING FIVE-POINT ROCK-DRILL BITS.

Application filed June 30, 1922. Serial No. 571,942.

*To all whom it may concern:*

Be it known that I, JESSE DITSON, a citizen of the United States, and a resident of Littleton, county of Arapahoe, State of Colorado, have invented a certain Apparatus for Forging Five-Point Rock-Drill Bits, of which the following is a specification, accompanied by drawings.

This invention relates to drill bits and more particularly to apparatus for forging drill bits of the type known as "five-point bits."

Owing to the peculiar conformation required in five-point rock drill bits, which are designed for certain uses, such for instance, as working in coal, it has been found very difficult to form such bits in any of the standard drill sharpening or forging machines which have supplanted hand-sharpening in every important connection.

Essentially, the five point bit of the type which has been found very satisfactory for working in coal consists of a large head having five radial wings of considerable length terminating in cutting edges. The head may either be formed in such manner as to be attached to the forward end of a drill steel, or may be integral with the drill steel, which may be either solid or hollow.

The outer sides of the bit conform generally to the contour of a cone, and the sides of the wings are preferably flat and taper towards the cutting edge and are given a greater degree of taper near the cutting edge. The center of the cutting face of the bit is formed into a conoidal recess, which may terminate at the hollow bore extending through the shank of the drill steel when a hollow steel is used, and this conoidal recess separates the forward ends of the wings, leaving five radial chisel edges.

Since it is an important feature of this type of bit that the radial wings which terminate in the cutting edges shall extend back to the base of the enlarged diameter portion of the drill steel constituting the bit end so as to permit the bit to cut deeply and allow adequate passage for the cuttings, it is necessary in forming such drill bits with the required backwardly tapering sides and inclined surfaces that the angles of inclination and convergence of the several surfaces and sides of the respective radial cutting members shall be properly formed on the bit in order to produce a structure which will accomplish the best results in practice.

The proper forming of five point bits has heretofore proven a tedious and difficult task, as a result of which such bits, which possess great advantages for certain purposes, have not been as generally used as other types of bits less efficient for such purposes.

The primary object of this invention is to enable five point drill bits to be forged or mechanically formed by an apparatus which will permit a drill sharpening machine such as shown in my Patent No. 1,258,998 dated March 12, 1918, to be used in conjunction with a standard set of dies, so that the five point bits may be manufactured by a series of upsetting and swaging operations performed in and by a drill sharpening or similar machine equipped with such standard set of dies, the manufacture of such bits being thereby greatly simplified.

Further objects will later appear and to the ends set forth the invention consists in the features of constructiton and operation set forth in the following specification and illustrated in the accompanying drawings, in which—

Figure 6 is a vertical sectional view of the partially formed drill bit and lower swaging die in position for carrying out the first step in the swaging operation;

Figure 7 is a view partly in section taken on the line 7—7 of Figure 6, looking in the direction of the arrows, showing the upper and lower swaging dies and the partially formed drill bit in the same position as in Figure 6;

Figure 8 is a vertical sectional view of the lower swaging die with the drill steel in position for carrying out a step in the swaging operation subsequent to the step illustrated in Figures 6 and 7;

Figure 9 is a sectional view of the drill bit taken on the line 9—9 of Figure 8, looking in the direction of the arrows;

Figure 10 is a vertical sectional view of the lower swaging die with the drill steel in position for carrying out a step in the swaging operation subsequent to the step illustrated in Figure 8;

Figure 11 is a sectional view of the drill bit taken on the line 11—11 of Figure 10, looking in the direction of the arrows;

Figure 12 is a vertical sectional view of the lower swaging die with the drill steel in position for carrying out the final step in the swaging operation; and Figure 13 is a sectional view of the finished drill bit taken on the line 13—13 of Figure 12 looking in the direction of the arrows.

Figure 1:
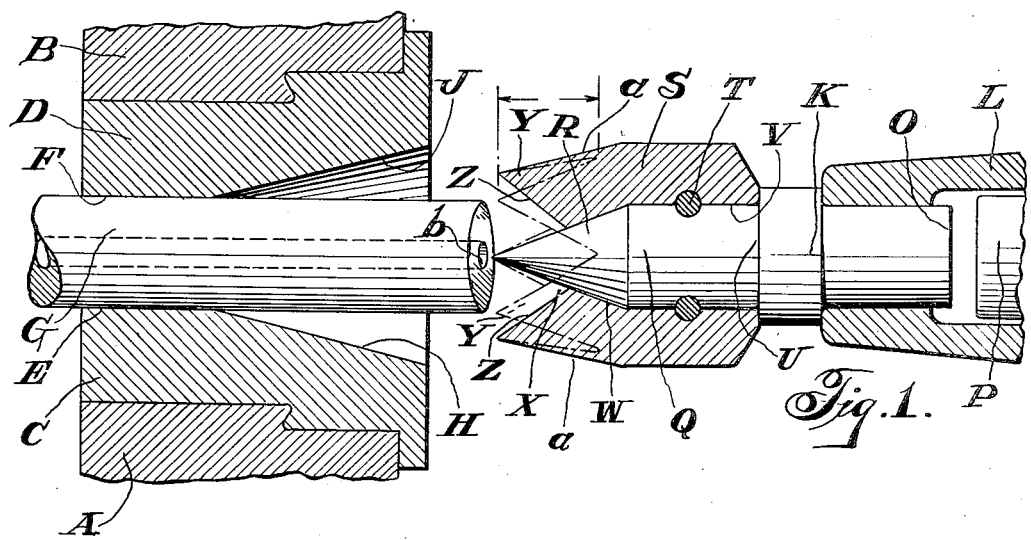
Figure 1 is a vertical sectional view through a portion of a drill sharpening apparatus embodying the invention, illustrating, specifically, the upsetting or dollying operation.

The process is usually carried out in a drill forming and sharpening machine such as shown in my prior patent before mentioned, only the essential forming parts being here illustrated. The drill forming and sharpening machine comprises a stationary anvil block or jaw A and a movable block or jaw B. Secured in one side of the anvil block A and of the block B are a pair of opposite upper and lower forming or upsetting dies C and D, in the inner faces of which are longitudinal semi-cylindrical grooves or depressions E and F, respectively, together forming a cylindrical bore for holding the shank of a heated drill steel G, these semi-cylindrical depressions E and F diverging near the outer faces of the dies C and D to form semi-conical recesses having inclined cooperating shaping faces H and J, which together form a true conical aperture when the anvil block A and block B are closed upon a drill steel, as shown in Figure 1.

Coacting with the upsetting dies C and D and adapted to enter the recess between the dies C and D is an upsetting or forming dolly K, mounted in the cylinder L of the percussive element forming a part of the drill sharpening machine. The dolly K is adapted to be actuated by blows administered on one end of the cylindrical shank O by a member P, only partly shown herein, which may be a reciprocating piston or an anvil block actuated by a reciprocating piston or any similar device.

The opposite end Q of the dolly shank is formed into a tapering end or point R, and a hollow five point annular former head S is adapted to fit around the pointed end R, being secured on the shank Q by one or more pins T, the ends of which may be riveted. The head S abuts against a shoulder U at the end of the shank portion Q opposite to the point R, and the wall of the interior bore V of the head S at the end adjacent to the point R forms a conical recess W, the taper of the walls of which corresponds to that of the point R, so that there is a close fit between the head S and shank Q. The head S is thus firmly secured and braced on the shank Q at the points W, U and T.

The former head S is provided with a plurality of circumferentially disposed V-shaped depressions or grooves X, in the present instance five, and tapered angular formers or points Y alternating with said grooves. The formers Y are disposed diametrically around the pointer R at an angle of 72° from each other, and have sharp inwardly inclined forming edges Z.

The outer sides $a$ of the formers Y are inclined in the same degree as the tapered conical aperture in the die blocks C and D.

In the operation of the apparatus so far described the shank of the heated drill steel G is inserted in the grooves E and F of the dies C and D and the upper clamping jaw or block B is brought down on the stationary jaw or anvil block A, so that the shank of the steel is clamped firmly between the dies C and D, its outer end projecting into the conical aperture formed by the conical grooves H and J and, if necessary, beyond the same a distance depending on the gauge of the bit to be formed. The steel G may project approximately to the end of the pointer R, this pointer R being in axial alignment with the longitudinal bore $b$ of the hollow drill steel G, since a hollow steel is shown in this instance, and the size or length of the forming dolly, and hence the distance of the dolly operating face from the ends of the dies C and D may be so calculated that this distance will equal the distance which the drill steel G should properly project beyond the dies C and D in order to provide the necessary amount of metal required for upsetting the steel and forming a drill bit of the specified width or gauge for which the particular dolly is adapted.

The dolly K is then actuated in the manner outlined above, which is well understood, to upset the end of the drill steel G. The formers Y and pointer R, which together constitute the operating face of the dolly, and the cooperating conical apertures H and J in the dies C and D cause the upset end of the steel to assume a corresponding external conformation.

The product of the operation just set forth is a drill shank with a partially formed bit. The partially formed bit consists of an enlarged symmetrical end $c$ of a diameter approximately equal to the gauge finally desired and five distinct symmetrical tapering portions $d$ having radially disposed straight parallel cutting edges or surfaces $e$, these tapering portions $d$ being disposed around a central inwardly directed conoidal depression $f$, which terminates in the bore $b$ of the hollow drill steel. Between the portions $d$ are angular depressions $g$. The portions $d$ have rounded inner and outer surfaces $d^1$ and $d^2$, respectively, and flat inclined opposite converging sides $d^3$, these flat sides $d^3$ constituting the walls of the angular depressions $g$ and forming the straight cutting edges $e$ at the outer point of convergence of the sides $d^3$ of each portion $d$. The rounded inner faces $d^1$ of the portions $d$ constitute the wall of the conoidal depression $f$.

The next step in the operation of forming the five point bit is carried out in a pair of swaging dies which are adapted to be placed in the jaws A and B of the drill sharpener in the same manner as the dies C and D. These swaging dies include an upper swaging die $h$ and a cooperating lower swaging die $j$. The upper swaging die $h$ has a central vertical longitudinal depression or groove $k$ in its under side, this groove $k$ being formed by opposite plane outwardly converging side forming surfaces $o$ and a rearwardly and inwardly inclined top or end $p$. Opposite separate forming surfaces $q$ and $r$, one at each side of the central groove $k$ and inclined upwardly at an angle of approximately 72° to the vertical axis of the central groove $k$, form the base or operating faces of the upper die $h$.

The lower die $j$ has two depressions or grooves $t$ and $u$ in its upper side. These grooves $t$ and $u$ are disposed at an angle of 72° to each other, the point of convergence of the vertical axes of the grooves $t$ and $u$ being in alignment with the vertical axis of the depression or groove $k$ in the upper jaw $h$. The grooves $t$ and $u$ have side and end surfaces $o$ and $p$, respectively, corresponding in all respects to the side and end surfaces $o$ and $p$ of the groove $k$ in the upper die $h$. The outer surfaces $v$ and $w$ adjacent to the longitudinal sides $x$ of the lower die $j$ are inclined abruptly outwardly and upwardly beginning at the shoulders $z$ which are located in the same distance from a hypothetical point $y$, (representing the point of convergence of the vertical axes of the grooves $t$ and $u$ and the groove $k$ of the lower and upper dies $j$ and $h$), as the shoulder $z'$ which is located at the point of convergence of the two inner surfaces $o$ of the grooves $t$ and $u$, so that separate inclined flat forming surfaces $v$ and $w$ are formed. These surfaces $v$ and $w$ are opposite to the surfaces $q$ and $r$, and their angle of inclination with respect to the vertical axes of the two grooves $t$ and $u$ in the lower swaging die $j$ corresponds with the angle of inclination of the surfaces $q$ and $r$ in the upper die $h$ with respect to the vertical axis of the groove $k$.

Together, the dies $h$ and $j$ having the opposing surfaces $q$ and $v$ and $r$ and $w$ constitute opposite shaping and forming members. When the dies $h$ and $j$ are caused to approach each other, the heated drill steel being between the dies, the surfaces $q$, $v$, $r$ and $w$ in effect correspond approximately to the sides $o$ of the depressions $k$ and $p$. Such correspondence will be exact, when the forming surfaces $q$ and $r$ are the same distance from the surfaces $v$ and $w$ as the sides $o$ of the depressions $k$ and $p$ are from each other. Because of the fact that the vertical axes of the grooves $k$ and $p$, as well as the vertical axes of the spaces between the surfaces $q$ and $v$, and $r$ and $w$, respectively, all radiate from the same point $y$ when the jaws $h$ and $j$ are in the position for exact correspondence referred to, and because of the further fact that all the surfaces are symmetrically disposed, and number five or multiples thereof, each of the depressions and surfaces will be at an angle of 72° to its adjacent forming surface or depression.

Figures 2, 3:
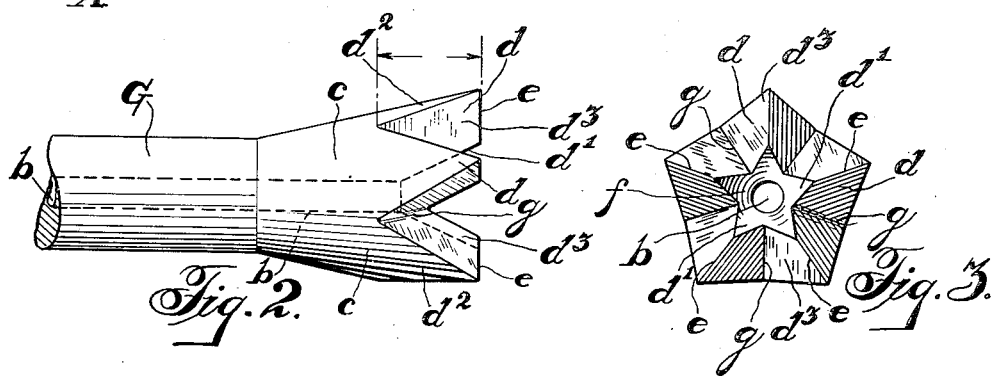
Figure 2 is a side view of a partially formed drill bit as it appears after the upsetting operation.
Figure 3 is an end view of the partially formed bit illustrated in Figure 2.
Figures 4, 5:
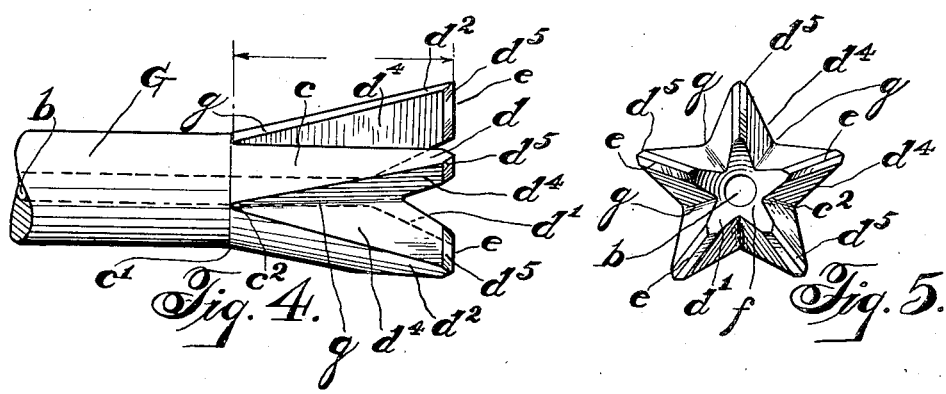
Figure 4 is a side view of a finished bit.
Figure 5 is an end view of the finished bit shown in Figure 4.

In the operation of the swaging dies $h$ and $j$ the end of the bit which has been partially formed in the forming dies C and D as shown in Figures 2 and 3, is placed between the dies $h$ and $j$ at a point some distance from the outer end of the dies $h$ and $j$, as shown in Figures 6 and 7. The dies $h$ and $j$ may be mounted in a different location on the drill sharpener than the dies C and D, but are secured to the stationary and movable members A and B. When the partially formed bit has been placed between the dies $h$ and $j$ two immediately adjacent portions $d$ find lodgement in the grooves $t$ and $u$, of the lower swaging die $j$, and the portion $d$ opposite these adjacent portions is aligned with the groove $k$ of the upper die. The remaining opposite portions $d$ are located between the surfaces $q$ and $v$ at one side, and the surfaces $r$ and $w$ at the other side. The upper swaging die $h$ is then moved up and brought down forcibly upon the heated steel a few times with the steel in the position shown in Figure 6, the steel being rotated or turned each time so that opposite portions $d$ are successively positioned between the surfaces $q$ and $v$, and $r$ and $w$, to receive the blows and pressure administered by the upper die $h$. The operation of the upper die $h$ results in the reduction of the angles of inclination and divergence of the flat sides $d^3$ of each of the portions $d$, commencing at a point short of the cutting edge as shown in Figure 6, which point is at some distance from the point of juncture of the enlarged diameter bit portion $c$ with the shank of the hollow drill steel indicated at $c'$. The steel is then moved longitudinally a short distance, as shown in Figure 8, so that the drill bit extends for a somewhat greater distance between the dies $h$ and $j$, and the upper die $h$ is actuated and the drill steel turned as in the first step of the swaging operation. The product of the second step as shown in Figure 9 differs from the partially formed bit shown in Figures 2 and 3 in that the portions $d$ now possess more definition, the inclined surfaces $d^3$ having been formed into opposite inclined sides $d^4$. This step may be repeated any desired number of times, the drill being moved slightly further into the dies $h$ and $j$ each time. The angle of inclination of the surfaces $q$, $v$, $r$ and $w$ is such that the width of the portions $d$ is gradually reduced as the drill bit is moved further into the dies. The beveled edges $d^5$ which are just barely discernible in Figure 9 but quite plain in Figures 5, 11 and 13, are left from the first dollying operations.

When the swaging operation has been repeated with the bit in approximately the position indicated in Figure 10, the beveled surfaces $d^5$ become somewhat more pronounced, and the sides $d^4$ attain greater radial length and less width, as seen in Figure 11.

Another result which takes place as the drill steel is progressively moved into the dies is that the angular depressions between each of the portions $d$ are lengthened simultaneously with the forming of the sides $d^4$ and the beveled surfaces $d^5$, at each step in the operations. After the drill bit has been moved so far into the dies $h$ and $j$ that the point of convergence of the flat outwardly inclined opposite converging sides indicated at $c^2$ under the swaging pressure of the dies $h$ and $j$ reaches approximately the point of juncture $c'$ of the enlarged diameter bit portion $c$ with the shank of the hollow drill steel G, as shown in Figure 12 and indicated by the arrows in Figure 4, the bit will have assumed the conformation indicated in section in Figure 13, the sides $d^4$ of each portion $d$ being formed down quite thin in the shape of inclined elongated radial wings, the grooves $g$ having been extended the greater distance indicated by the arrows between the two dotted lines in Figure 4 as compared with the distance indicated by the arrows between the two dotted lines in Figure 2 showing the partially formed bit produced in the upsetting operation. The bit is finally completed as shown in Figures 4 and 5.

One important advantage of the present method and apparatus lies in the fact that only a single pair of upsetting dies C and D and a single pair of forming or swaging dies $h$ and $j$ are needed to form and swage down five point bits to the proper gauge, the several operations necessary to properly swage down this peculiar type of drill bit after the preliminary upsetting operation, all being performed by simply changing the position of the bit in the dies $h$ and $j$ instead of employing a separate set of dies for each step.

I claim:

1. Apparatus for forming a five point rock drill bit, comprising, in combination with a drill sharpener, removable upper and lower swaging dies, one die being movable to and from the other to effect the swaging and one of said swaging dies having a central vertically disposed longitudinal groove with flat sides and a rearwardly inclined end, separate forming surfaces on opposite sides of said centrally disposed groove, said separate surfaces being inclined at an acute angle to the vertical axis of said central groove, the other swaging die having two grooves disposed at an angle to each other, said grooves having sides and ends corresponding to the sides and end of the groove in the first mentioned swaging die, separate forming surfaces in the second mentioned die disposed at a similar angle to the vertical axes of the respective adjacent grooves, said first named and said last named opposing separate forming surfaces being oppositely inclined and adapted to act on opposite sides of a drill steel.

2. Apparatus for forming a five point rock drill bit comprising, in combination with a drill sharpener, removable upper and lower swaging dies, one die being movable to and from the other to effect the swaging and one of said swaging dies having a central vertically disposed longitudinal groove with flat diverging sides and a rearwardly and inwardly inclined end, a pair of separate forming surfaces one on each side of said centrally disposed groove, said separate forming surfaces being inclined at an angle of 72° to the vertical axis of said central groove, the other swaging die having two grooves disposed at an angle of 72° to each other, said grooves having sides and ends corresponding to the sides and end of the groove in the first mentioned swaging die, the point of convergence of the vertical axes of said two grooves being in alignment with the vertical axis of the groove in the upper jaw, a pair of separate forming surfaces in said second mentioned die disposed at a similar angle to the vertical axes of the respective adjacent grooves, said first named and said last named opposing pairs of separate forming surfaces being inclined rearwardly and inwardly at approximately the same angle as the sides and ends of the grooves in the dies, each of said grooves and forming faces being at an angle of 72° to its adjacent forming face or groove, said swaging dies being adapted to act on opposite sides of a drill steel.

3. Apparatus for forming a five point rock drill bit, comprising, in combination with a drill sharpener, a pair of swaging dies, one die being movable to and from the other to effect the swaging and one of said dies having a central vertically disposed longitudinal groove adapted to receive one wing of a drill steel, and a pair of separate inclined forming surfaces one on each side of said centrally disposed groove, said separate forming surfaces being inclined at an angle of 72° to the axis of said longitudinal groove, the other of said dies having two grooves disposed at an angle of 72° to each other, said two grooves corresponding with said first mentioned groove and being adapted to receive two wings of said drill steel, and a pair of separate inclined forming surfaces in the other die disposed at a similar angle to the vertical axes of the respective adjacent grooves, said opposing separate forming surfaces being adapted to receive the remaining wings of said drill steel.

In testimony whereof I have signed this specification.

JESSE DITSON.